(12) United States Patent
Crockett et al.

(10) Patent No.: US 7,099,453 B2
(45) Date of Patent: Aug. 29, 2006

(54) METHOD AND APPARATUS FOR ENHANCED CALL ROUTING IN A TELECOMMUNICATION SYSTEM

(75) Inventors: Susanne Marie Crockett, Buffalo Grove, IL (US); Thomas Joseph McBlain, Arlington Heights, IL (US); Vanessa Besteda Jackson, Oak Park, IL (US); Bruce Edward Stuckman, Austin, TX (US); Karen Jeanne Pelletier, LaQuinta, CA (US)

(73) Assignee: SBC Properties, L.P., Reno, NV (US)

( * ) Notice: Subject to any disclaimer, the term of this patent is extended or adjusted under 35 U.S.C. 154(b) by 353 days.

(21) Appl. No.: 09/963,719

(22) Filed: Sep. 26, 2001

(65) Prior Publication Data

US 2003/0059023 A1 Mar. 27, 2003

(51) Int. Cl.
*H04M 7/00* (2006.01)
(52) U.S. Cl. .................. 379/220.01; 379/221.01; 379/221.08; 379/88.03; 379/216.01; 379/355.01; 379/355.05
(58) Field of Classification Search .......... 379/220.01, 379/221.01, 221.08, 88.03, 216.01, 355.01, 379/355.05
See application file for complete search history.

(56) References Cited

U.S. PATENT DOCUMENTS

| | | | |
|---|---|---|---|
| 4,313,035 A | 1/1982 | Jordan et al. | |
| 4,809,321 A | 2/1989 | Morganstein et al. | |
| 4,926,470 A | 5/1990 | Sanford | |
| 5,027,384 A | 6/1991 | Morganstein | |
| 5,276,731 A | 1/1994 | Arbel et al. | |
| 5,278,894 A | 1/1994 | Shaw | |
| 5,329,578 A * | 7/1994 | Brennan et al. | 379/211.03 |
| 5,434,908 A | 7/1995 | Klein | |
| 5,436,963 A | 7/1995 | Fitzpatrick et al. | |
| 5,467,388 A | 11/1995 | Redd, Jr. et al. | |
| 5,473,671 A | 12/1995 | Partridge, III | |
| 5,535,263 A | 7/1996 | Blumhardt | |
| 5,546,453 A | 8/1996 | Hebert | |
| 5,548,637 A | 8/1996 | Heller et al. | |
| 5,572,583 A | 11/1996 | Wheeler, Jr. et al. | |
| 5,574,782 A | 11/1996 | Baird et al. | |
| 5,592,541 A | 1/1997 | Fleischer, III et al. | |
| 5,600,704 A | 2/1997 | Ahlberg et al. | |
| 5,600,710 A | 2/1997 | Weisser, Jr. et al. | |
| 5,610,970 A | 3/1997 | Fuller et al. | |
| 5,629,978 A | 5/1997 | Blumhardt et al. | |
| 5,644,631 A | 7/1997 | Sattar et al. | |
| 5,652,789 A | 7/1997 | Miner et al. | |
| 5,742,905 A | 4/1998 | Pepe et al. | |
| 5,771,279 A | 6/1998 | Cheston, III et al. | |
| 5,790,173 A | 8/1998 | Strauss et al. | |
| 5,796,806 A | 8/1998 | Birckbichler | |

(Continued)

OTHER PUBLICATIONS

Allen Miller, Internet-based subscriber profile managment of a communication system, May 15, 1998.*

*Primary Examiner*—Quynh H. Nguyen
(74) *Attorney, Agent, or Firm*—Brinks Hofer Gilson & Lione

(57) ABSTRACT

A method for routing calls in a telecommunication system includes detecting data for a call from a calling party to a called party, providing a menu of options to the calling party and routing the call in accordance with information about the calling party, information about the called party or a menu selection.

11 Claims, 12 Drawing Sheets

U.S. PATENT DOCUMENTS

| | | |
|---|---|---|
| 5,812,654 A | 9/1998 | Anderson et al. |
| 5,822,418 A | 10/1998 | Yacenda et al. |
| 5,825,862 A | 10/1998 | Voit et al. |
| 5,862,209 A | 1/1999 | Kapsales |
| 5,883,946 A | 3/1999 | Beck et al. |
| 5,905,789 A | 5/1999 | Will |
| 5,915,008 A | 6/1999 | Dulman |
| 5,937,041 A | 8/1999 | Cardillo, IV et al. |
| 5,958,016 A | 9/1999 | Chang et al. |
| 5,963,626 A | 10/1999 | Nabkel |
| 6,028,917 A * | 2/2000 | Creamer et al. ....... 379/100.01 |
| 6,041,114 A * | 3/2000 | Chestnut ................ 379/211.02 |
| 6,160,876 A | 12/2000 | Moss et al. |
| 6,160,877 A * | 12/2000 | Tatchell et al. .............. 379/197 |
| 6,647,108 B1 * | 11/2003 | Wurster et al. ........ 379/215.01 |
| 6,674,851 B1 * | 1/2004 | Brush et al. ........... 379/221.08 |
| 6,744,861 B1 * | 6/2004 | Pershan et al. .......... 379/88.03 |

\* cited by examiner

METHOD AND APPARATUS FOR ENHANCED CALL ROUTING IN A TELECOMMUNICATION SYSTEM

BACKGROUND

The present invention relates generally to telecommunication systems. More particularly, the present invention relates to method and apparatus for providing customized call routing based on providing a caller a menu of call routing options.

Recent advances in telecommunication technology allow for telecommunication service providers to make available increased and more flexible telephone service customization. The Advanced Intelligent Network (AIN) has increased capability of telephone networks to provide services to users. An Advanced Intelligent Network includes a service control point (SCP) containing software for AIN services, a service switching point (SSP) containing special software that allows it to identify AIN calls and communicate with the SCP, and may include one or more intelligent peripherals (IP), such as Service Nodes, which are network elements containing functionality and resources which may be used to exchange information with an end user. When a telephone call is made that would require a network to provide some type of customized call processing service, an AIN trigger is detected at the SSP and an AIN message is communicated to an SCP. Once an AIN message is received by an SCP, the various network components begin to communicate over data lines with one another.

One particular service requirement in a telecommunication system is for an ability to locate a called party who may be away from his normally used telephone. Some subscribers of telephone services have multiple land lines, cellular or other radiotelephone service, facsimile lines, pagers and other numbers. These devices increase mobility for the subscribers and, at the same time, reduce the likelihood of finding the subscriber. Accordingly, there is a need for method and apparatus for routing calls to a subscriber in a telecommunication system.

DETAILED DESCRIPTION OF THE PRESENTLY PREFERRED EMBODIMENTS

By way of introduction, the embodiments described below relate to method and apparatus for providing customized call routing based on providing a caller with a menu of call routing options. In general in these embodiments, a caller is presented with a menu of call routing options to locate the subscriber, any one of which may be selected as a destination for the call. The contents of the menu are determined based on a subscriber profile or other information provided by the subscriber and stored in the telecommunication system. Upon selection of a menu option by the caller, the selection is detected by the system and the call is automatically forwarded to the selected destination. Additional enhancements and embodiments of the basic system are also described.

Figure 1:
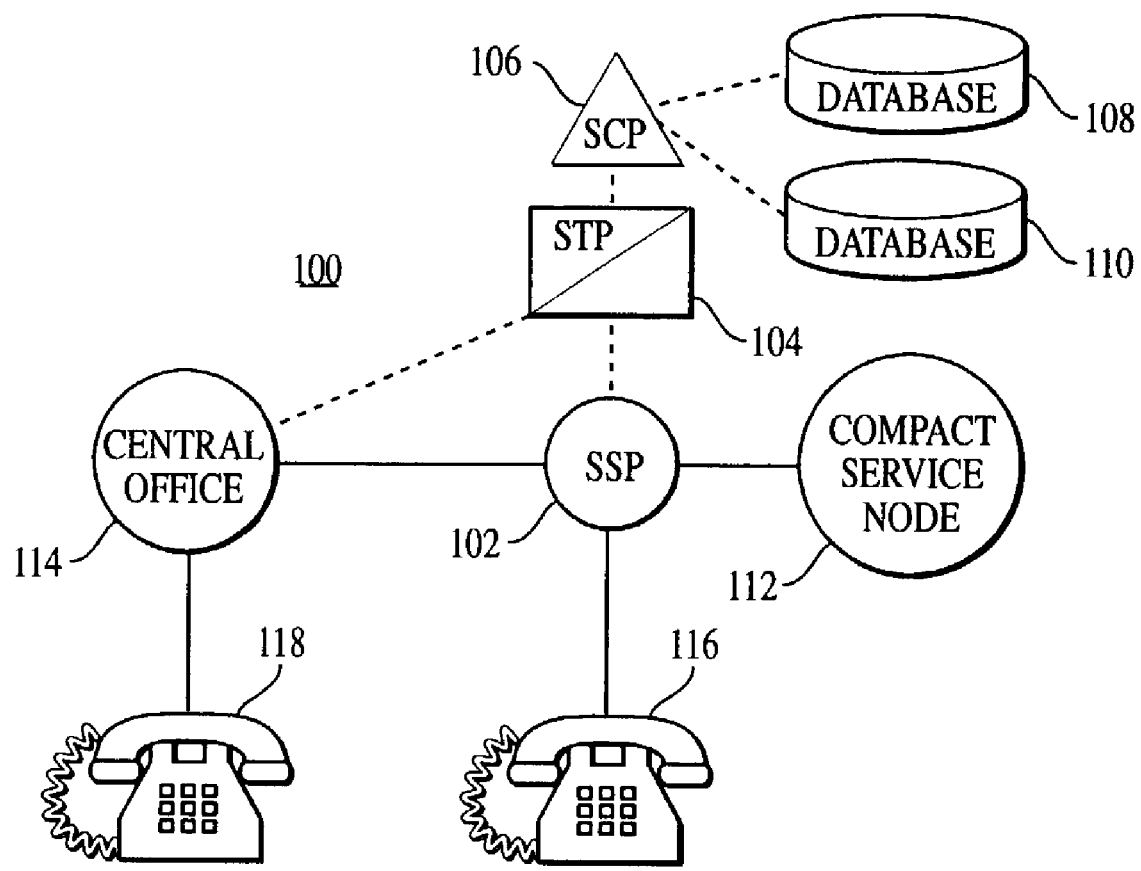
FIG. 1 is a block diagram of a telecommunication system.

Referring now to the drawing, FIG. 1 is a block diagram of a telecommunications system 100. The system 100 comprises a service switching point (SSP) 102, a signal transfer point (STP) 104, a service control point (SCP) 106, a first SCP database 108, a second SCP database 110, a compact service node (CSN) 112, a central office 114, called telephone station 116 and calling telephone station 118. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 102 preferably comprises an AIN switch that routes calls, recognizes and responds to triggers, generates queries to obtain call information and responds to returned call information from other AIN components. SSP 102 connects called telephone station 116 with central office 114 to enable calls to be placed between called telephone station 116 and calling telephone station 118. SSP 102 preferably communicates with SCP 106, central office 114 and CSN 112 by utilizing a signaling protocol such as Signaling System 7 (SS7) or other such signaling protocols as presently known to those skilled in the art or developed in the future. SSP 102 preferably generates queries to SCP 102 and receives and responds to responses to the queries returned from SCP 106. In the illustrated embodiment, communication between the SSP 102 and the SCP 106 employs Transaction Capabilities Applications Protocol or TCAP.

STP 104 preferably comprises a network element that transfers signaling communications in response to signaling protocols such as SS7 or other such signaling protocols as presently known to those skilled in the art or developed in the future. STP 104 preferably transfers queries from SSP 106 to SCP 106 and transfers responses to the queries from SCP 106 to SSP 102.

SCP 106 preferably comprises an AIN element that stores call information and receives and responds to queries. SCP 106 preferably stores call control information in the first SCP database 108 and can access the stored call control information. SCP 106 also stores standard caller identification information in the second SCP database 110 and can access the stored caller identification information. SCP 106 receives queries generated by SSP 102 and preferably responds to the queries by performing database searches to locate the requested call control information or caller identification information as known to those skilled in the art. SCP 106 can forward the call control information or caller identification information to SSP 102.

CSN 112 preferably comprises a network element that enables communications between telephone stations 116, 118 and the network. CSN 112 can preferably transmit messages to and receive responses from telephone stations 116, 118. CSN 112 can generate announcements that can be transmitted to telephone stations 116, 118. CSN 112 can transmit responses such as audible caller identification information from telephone station 118 to telephone station 116 by connecting telephone stations 118, 116 or by recording and playing back the responses as known to those skilled in the art. The announcements transmitted to telephone station 116 preferably comprise accept and reject options along with requests for input from the telephone station 116. The requests for input preferably comprise requests for input that can be used by CSN 112 to cancel calls to telephone station 116, connect calls to telephone station 116, forward calls to a voice mail system or another location such as another telephone line, and transmit messages to telephone station 118. As used herein, the term voice mail system means all types of message recording systems as known to those skilled in the art. CSN 112 can preferably receive and respond to the input transmitted from telephone station 116. The term input means any suitable signal such as DTMF tones, voice input, dial pulse input or modem/fax input as known to those skilled in the art.

In alternative embodiments, other system equipment may provide the functions provided by CSN 112. For example, equivalent functionality may be provided by an AIN service node or by an Intelligent Peripheral, as those terms are understood in the art. These components and others which are operationally equivalent may be substituted for the CSN 112 in FIG. 1.

Database 108 preferably comprises a data storage element for use with SCP 106 as known to those skilled in the art. Database 108 preferably stores call control information that can be implemented by SSP 102 to control calls. Such call control information is known to those skilled in the art.

Database 110 preferably comprises a standard caller identification with name database as known to those skilled in the art. Database 110 preferably includes the name of the person associated with calling telephone station 118 along with the telephone number that is associated with calling telephone station 118. Database 110 can alternatively comprise a directory assistance database as known to those skilled in the art. While databases 108, 110 are depicted within a telecommunications system, databases 108, 110 can comprise any suitable databases containing information adapted for use in the present embodiment and are not limited to databases located within a telecommunications network. It is also important to note that while databases 108, 110 are shown as separate components, they can be implemented as a single database.

Central office 114 preferably comprises an AIN network switch as known to those skilled in the art. Central office 114 enables calls to be placed between calling telephone station 118 and called telephone station 116. Alternatively, central office 114 can comprise a non-AIN network switch as known to those skilled in the art.

Telephone stations 116, 118 preferably comprise analog telephone sets as known to those skilled in the art. Alternatively, telephone stations 116, 118 can comprise wireless, PCS, ISDN or any other form of communication station known to those skilled in the art. Called telephone station 116 preferably includes CPE equipment for use with caller identification services as known to those skilled in the art.

In one embodiment described herein, the components of the telecommunication system 100 communicate in accordance with a standard generally referred to as GR1129. This standard is described in a Bellcore publication known as "GR1129: Switch-Intelligent Peripheral Interface." The GR1129 standard defines a protocol which directs that communications between the SCP and the IP travel to the SSP. This method of communication between network elements of an AIN permits the SSP to keep track of billing records and release the SSP-IP voice/data connection when it is no longer required while maintaining control of the original call. Additionally, the SSP can receive subsequent call processing instructions from the SSP for the same call as part of the same initial transaction. There are, however, limitations to the GR1129 protocol. For example, messaging and communication among AIN elements according to GR1129 is somewhat rudimentary and inflexible. The command structure and messaging format do not allow a large variety of data or commands to be conveyed in GR1129. Additionally, the GR1129 interface places a significant processing demand on the SSP because all data communications from the SCP to the IP go through the SSP and require the SSP to reformat SS7 messages from the SCP into ISDN messages to send to the IP, and vice versa. Further discussion of the operation of the system 100 in conjunction with GR1129 will be provided in greater detail below.

Figure 2:
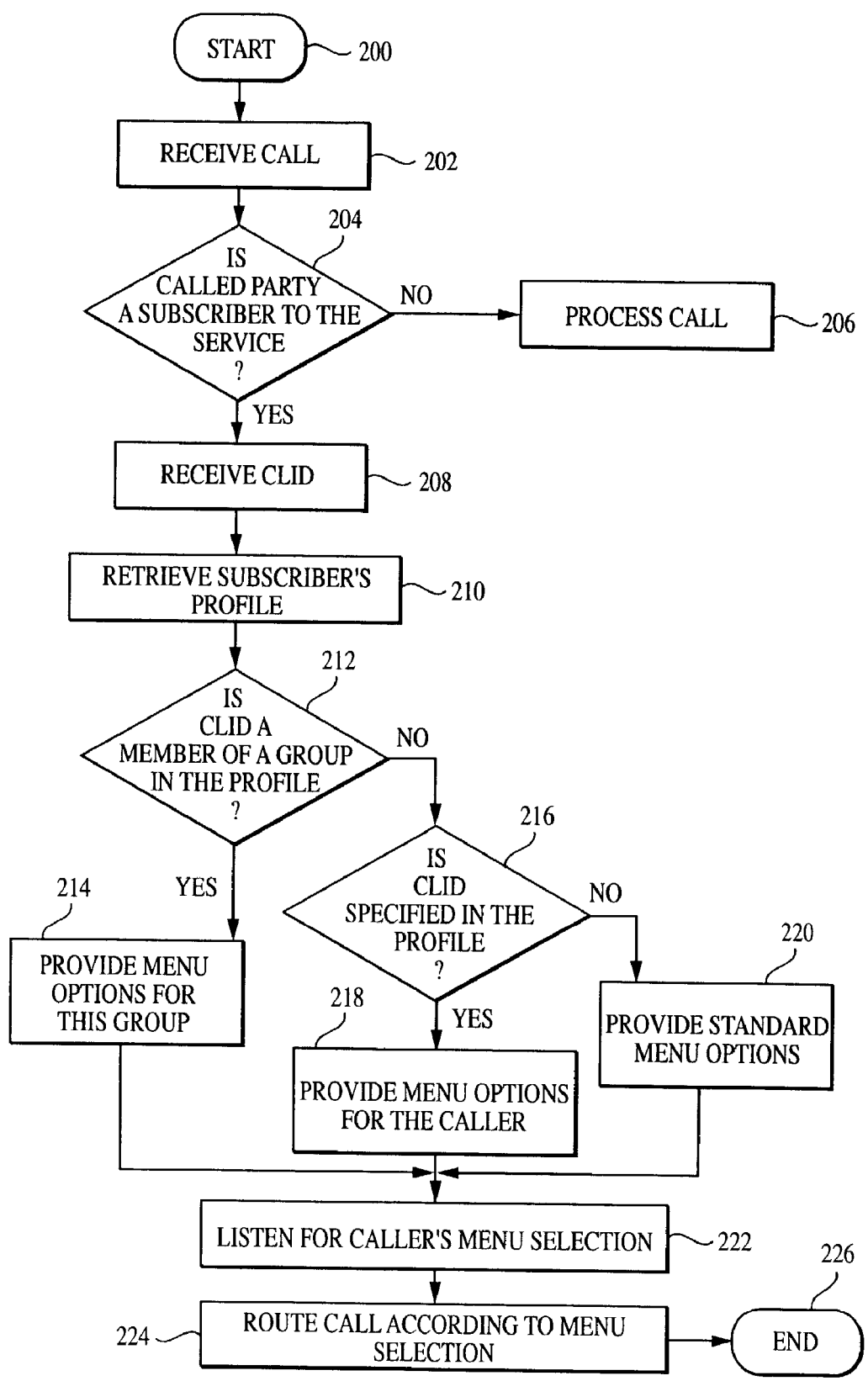
FIG. 2 is a flow diagram illustrating one embodiment of a method for operating the telecommunication system of FIG. 1.

FIG. 2 is a flow diagram illustrating one embodiment of a method for operating the telecommunication system of FIG. 1. FIG. 2 relates to a method for call screening on customized call routing service. In particular, the method illustrated in FIG. 2 relates to an enhancement to customize call routing services in which a menu is provided to the caller, the menu being based not only on a subscription tied to the called party, but also based on the identity of the calling party. In one example, a particular calling number, by itself or in a group, indicates that a particular menu should be played instead of the subscriber's normal menu. For example, the subscriber might predefine a family group, a work group, a building team group, etc. If the caller's number is associated with one of these predefined groups, the options which populate the menu provided to the caller are selected based on that group membership. One advantage of this particular method is that the method allows customers to not provide all numbers and menu choices to all callers. For example, the subscriber may not want members of the work group to be able to reach the subscriber on the subscriber's car phone. Instead, the subscriber may prefer to have the car phone option provided only to friends or family group members.

The method begins at block 200. The method illustrated in FIG. 2 may be performed by a telecommunication system such as an AIN telecommunication network, by one component of such a system, such as an SCP, or the acts of the embodiment shown in FIG. 2 may be performed in a distributed fashion by several components of such a telecommunication system. It is well within the purview of those ordinarily skilled in the art to implement the method described herein in components of AIN telecommunication network, such as an SCP, one or more signal switching points and one or more signal transfer points.

At block 202, the network receives a call. The call is placed by a calling party or caller and intended for a called party or called communications station. The call is described by various information, including the directory number (DN) associated with the called communication station or called party, and the calling line identification information (CLID) associated with the caller or calling communication station. One or more components of this associated information, such as the CLID may be extracted from the call and passed among components of the network processing the call for routing or other processing.

At block 204, the network determines if the called party is a subscriber to the service. In this example, the service is used to provide customized call screening based on the caller ID or the membership of the caller in a predefined group. At block 204, the directory number for the called party is compared with a list of subscribers to the service, for example in an SCP. Thus, in an AIN embodiment, the call is received at an end office switch such as an SSP and the call routing information including the directory number and the CLID are extracted from the call. The SSP communicates a query to the SCP which retrieves information related to the directory number from the SCP database associated with the SCP. Information about this directory number and its associated service subscription may be stored in the SCP database. If it is determined that the directory number is not associated with subscriber, the call is processed normally, block 206.

At block 208, the calling line identification information or other data about the caller or calling communication station is received by the system. In one embodiment, this information is conveyed with the call through the network and extracted by the system. At block 208, the subscriber's profile is retrieved from storage. In this embodiment, the subscriber has established a call routing profile which defines possible destinations for the call, possible callers, possible groups of which the caller may be a member and other information. As noted above, in one embodiment, the subscriber's profile is stored at the SCP database of an AIN network.

At block 212, it is determined if the calling party associated with the CLID is a member of a group defined in the subscriber's profile. As noted, the profile may define one or more groups of possible callers, such as a work group, a family group, etc., and even subgroups within these groups. At block 212, a comparison is made between the CLID or data or other information related to the CLID and members of the different groups defined by this subscriber. That is, a straight number-to-number comparison for the directory number of the calling line may be compared with directory numbers stored in the profile, or a text identifier associated with the name or other identifying information for the caller may be compared with text identifiers stored in the profile. At block 214, if the caller is defined as a member of a group in the subscriber's profile, a menu customized for the group or the caller is provided to the caller. This menu specifies the calling options for this group. The menu options may include choices such as "press 2 to leave a voice mail message," "press 3 to call cell phone," "press 4 to call work phone" and "press 5 to page." As noted, the menu options provided for different groups may vary depending on the desires and requirements of the subscriber.

At block 216, it is determined if the CLID is specified for a particular treatment in the subscriber's profile. In this example, the caller defines his own individual group. The subscriber has specified a particular menu to be provided to this calling party. In this case, at block 218, the specified menu options chosen by the subscriber for presentation to this caller are provided to this caller.

At block 220, if the caller is not a member of a group or is not individually specified in the profile for a customized menu, at block 220 standard menu options are provided to the caller. These menu options may be standard choices specified by the subscriber in the profile for standard treatment or these menu options may be default values specified by the system when the subscriber has not directed particular treatment for this caller or group.

At block 222, after provision of the menu options in accordance with one of blocks 214, 218, 220, the system listens to detect the menu selection made by the caller. This may be accomplished by detecting dual tone multi-frequency (DTMF) tones provided by the caller pressing keys of the telephone of the calling communication station, by detecting a spoken menu selection by the caller, or by any other suitable method. At block 224, the call is routed according to the menu selection received at block 222. The method ends at block 226.

Figure 3:
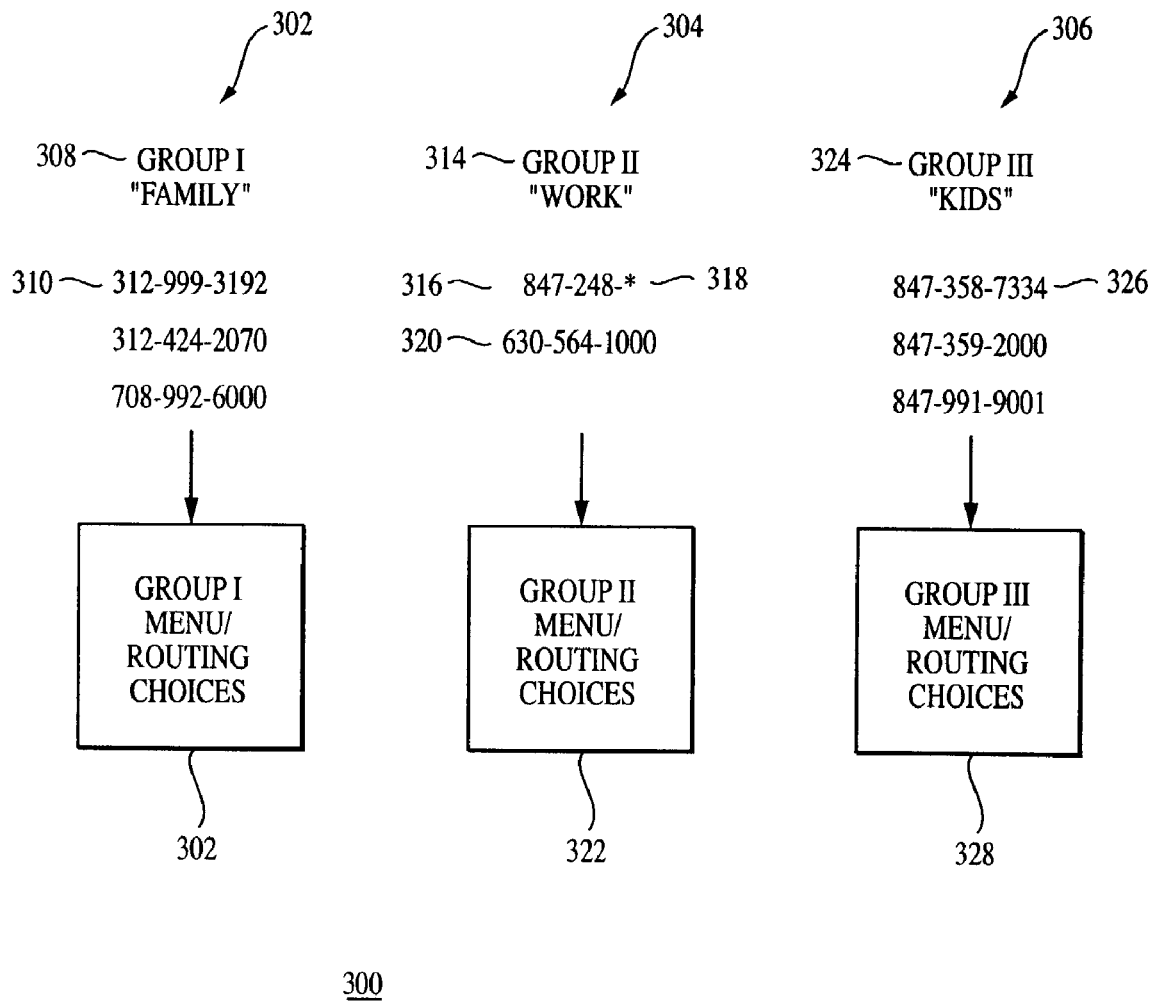
FIG. 3 illustrates data storage in a portion of the telecommunication system of FIG. 1 in accordance with the method illustrated in FIG. 2.

FIG. 3 illustrates data stored in a portion of the telecommunication system of FIG. 1 in accordance with the method illustrated in FIG. 2. In particular, FIG. 3 illustrates one embodiment of a subscriber profile 300 for use in establishing a customized call screening and call routing system. The subscriber profile 300 includes three groups 302, 304, 306 established by the subscriber. As established by the subscriber, the group 302 is established with a convenience label, Group I "family". The label may be chosen to help the subscriber identify the group or may be assigned automatically or by default by the system. The members 310 of the group 302 are specified by the subscriber. In this embodiment, the members are specified by listing the directory numbers associated with the group members. During processing of a call, if one of these directory numbers is detected by comparing the calling line identification information with the group member, the call will be processed according to the service described herein. Further in FIG. 3, the members 310 of the group 308 are associated with predefined menu and routing choices 312 specified by the subscriber. The menu and routing choices 312 may be any selected by the subscriber. Examples are provided above. In addition, other examples include routing all calls from the group to voice mail, canceling or disconnecting all calls received from a group member, or requiring entry of a personal identification (PIN) number as an added level of security or confirmation before providing access to the subscriber.

A second group 304 has a group label Group II "work". The group 304 has two members specified, member 316 and member 320. However, in specified member 316 the subscriber included an asterisk 318 as a wild card to specify that the group 304 includes all directory numbers which begin with 847-248-, without regard to the remaining four numbers of the directory number. The member 316 thus actually corresponds to a subgroup 316. Thus, where all work numbers of the group 304 have been assigned to the area code 847 and the exchange 248, the subgroup of all work numbers will be located by the system as being in the group 304 and be given the treatment specified by the menu and routing choices 322 associated with the group 304. In addition to the subgroup 316, the group 304 also includes members 320.

The group 306 has been given the identifier Group III "kids" 324 by the subscriber. Upon receipt of a call associated with any of these directory numbers, the call will receive the routing specified by the menu and routing choices 328 specified by the subscriber.

In one embodiment, the subscriber may specify the information illustrated in FIG. 3 by using a World Wide Web (WWW or "web") window and Internet access to the database maintained by the service provider. Preferably, the web page provides a plurality of data entry slots and data entry guidance information for the subscriber to define and populate the groups 302, 304, 306. In addition, preferably the information about menu and routing choices is displayed for easy selection by the subscriber. Upon defining the groups, the subscriber may transmit the web page to the service provider, where the information is received and the subscriber profile is established. Subsequently, the subscriber preferably can update his profile using the same technique. By accessing a database of profile information, the subscriber can preferably view the information, make changes, deletions and additions as required and resubmit the information for updating the profile.

Other techniques for establishing and maintaining the profile may be employed as well. For example, an interactive voice response (IVR) system may be established for keypad and voice entry of the required information. Alternatively, the caller may speak with an operator or other representative of the service provider to establish and update the subscriber profile. Any other suitable technique may be used as well.

Thus, FIGS. 2 and 3 illustrate one embodiment of a method for routing calls in a telecommunication system. This method includes detecting data associated with a call from a calling party to a called party. The call is routed in accordance with information about the calling party and the called party. Examples of this information include the calling line identification information of the calling party and the subscriber profile and directory number of the called party. Other information about the two parties to the call may be used as well. The calling party is provided with a call routing message which has been customized for the calling party based at least in part on information about the calling party.

Preferably, a menu of call routing options is provided to the calling party, the options being customized for the calling party. In one embodiment, the options are selected from a group of options based on the calling line information and the retrieved subscriber profile. In another embodiment, based on the retrieved subscriber profile, a call group with which the caller's calling line information is associated is identified by the system. The menu of call routing options is customized for the calling party based on the identified call group.

This method may be implemented by a telecommunication system which includes a network element configured for processing a call between a calling party and a called party, such as an SCP. The system further includes computer readable program code which is stored at the network element and includes a first computer readable code to obtain a subscriber profile for the called party, a second computer readable program code to determine information about the calling party and a third computer readable program code which formats a menu of call routing options customized for the calling party based on the subscriber profile and the information about the calling party. The computer readable program code may be stored and executed at any suitable locations within the network. The computer readable program codes may be subroutines or portions of other routines or subroutines executed by call processing equipment of the network.

Figure 4:
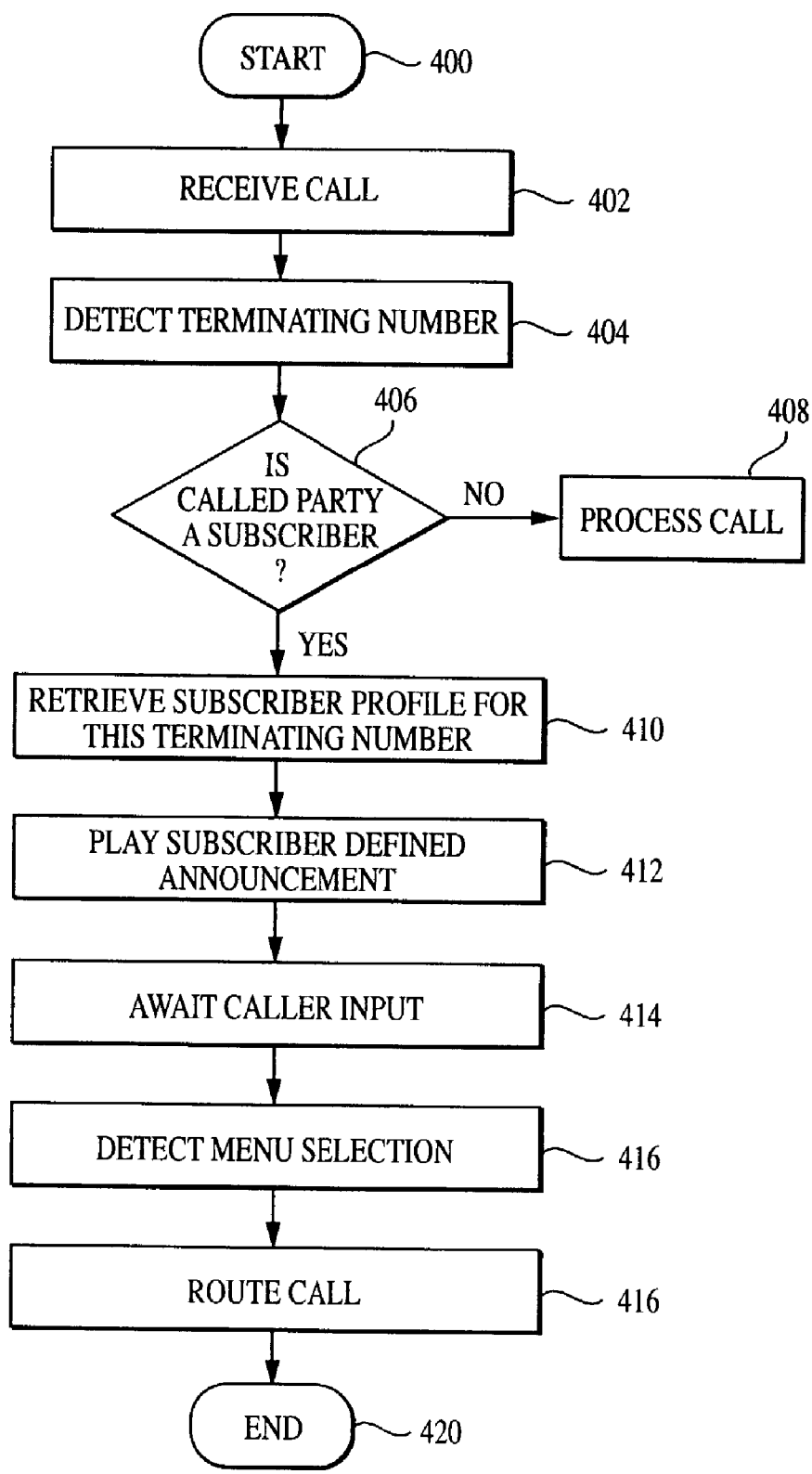
FIG. 4 is a flow diagram illustrating another embodiment of a method of operating the telecommunication system of FIG. 1.

FIG. 4 is a flow diagram illustrating another embodiment of a method for operating a telecommunication system of FIG. 1. The embodiment of FIG. 4 provides enhanced customized call routing by routing calls intended for a subscriber to a service node, intelligent peripheral, or other network device. There, the service node plays a user defined, customized announcement as well as routing directions such as call numbers, time of day, day of week, or menu selections based on a pre-established subscriber template or profile. The announcements provided by the service node can include a mixture of spoken, canned phrases, customer recorded phrases, text entered by the customer, for example via a World Wide Web interface, which can be altered using text to speech processes. The service node or other network equipment then listens for menu choices, such as DTMF keypad entry of spoken responses from the caller using voice recognition. The service node then routes the call back out to the network based on the choices made by the caller and the customer's profile.

Previous devices only provided customization for subscribers. An interactive voice response or service management system screen has allowed subscribers to enter routing telephone numbers and a selected routing plan based on time of day, day of week, etc. The embodiment illustrated herein provides the advantage of customization of call routing selections on a service node, taking advantage of the service node's flexibility to provide user defined announcements as well as routing directions. The method begins at block 400.

At block 402, a call is received by the system. The embodiment described in FIG. 4 may be implemented in any telecommunication network. One exemplary suitable telecommunication network is an Advanced Intelligent Network (AIN) and its constituent components. These components include in typical embodiments an originating switch or SSP where the call is received, a terminating switch or SSP associated with the called communication station of the called party, one or more SCPs, and in the preferred embodiment, one or more service nodes or intelligent peripherals. At block 404, the terminating number for the received call is detected. The terminating number is the directory number or other identifying information associated with the called party.

At block 406, the system determines if the terminating number is associated with a called party who is a subscriber to the service. If the called party is not a subscriber, at block 408 the call is processed normally. If the called party is a subscriber, at block 410, the system retrieves a subscriber profile for this terminating number or for this subscriber. The subscriber profile may be stored at any suitable location in the system, such as an SCP database associated with the SCP of the network.

At block 412, a subscriber-defined announcement is played for the called party. Preferably, the call or data related to the call is routed to the service node, intelligent peripheral or other network element capable of playing announcements and collecting entered digits or other caller response information. In a typical embodiment, calling information is routed from an SCP to the SN to identify the call and provide the subscriber profile information suitable for providing an announcement and collecting caller response information. The service node or intelligent peripheral is particularly well suited for this purpose. In response to the subscriber profile information, the intelligent peripheral establishes a connection to the calling party and plays a subscriber defined announcement. This may include, for example, playing a standard announcement selected by the subscriber. One or more canned announcements, such as "to leave a voice mail message, press 2," may be provided for selection and designation by the subscriber when establishing subscriber profile. Playing the subscriber defined announcement may further or alternatively include playing a recorded announcement recorded by the subscriber. This may be similar to the voice mail greeting that is provided in some voice mail or other answering systems, but may be customized and enhanced for providing call routing information. Any suitable information may be provided by the subscriber including messages for particular callers, a schedule of availability, a list of possible telephone numbers where the subscriber may be reached, etc. Preferably, the recorded announcement includes a menu of caller options. Playing the recorded announcement may be achieved by recording a subscriber-defined message, digitizing the message as subscriber defined message data and storing the data. When the message is played back, the announcement is provided by retrieving the subscriber-defined message data and converting the message data to an audible announcement. Alternatively, rather than recording audible customer message data, the customer or subscriber may enter text, via a web interface, for example, which is stored. Upon message playback, the subscriber defined message text is retrieved and converted to audible speech using a text to speech process.

At block 414, the system awaits a caller input in the form of spoken call routing information, a DTMF keypad entry or other input. At block 416, the system detects the menu selection made by the caller. Preferably, the service node detects, identifies and converts DTMF data into menu selection data which may be used to route the call. Alternatively, the service node may detect a spoken response provided by the caller, convert the spoken response to selection data and route the call according to the selection, block 418. The method ends at block 420.

Figure 5:
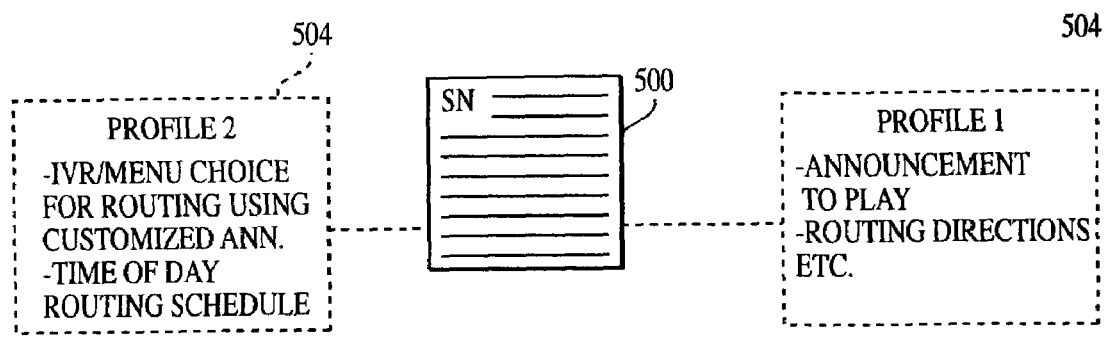
FIG. 5 illustrates data storage in a portion of the telecommunication system of FIG. 1 in accordance with the embodiment of FIG. 4.

FIG. 5 illustrates data storage in a portion of the telecommunication system of FIG. 1 in accordance with the embodiment of FIG. 4. In the exemplary embodiment of FIG. 5, a service node 500 stores two subscribers' profiles, a first profile 502 and a second profile 504. In alternative embodiments, the profiles 502, 504 may be stored at other locations in the network, such as an SCP database. Storing the subscriber profiles at the service node 500, however, reduces or eliminates the need to communicate the subscriber profile over the network during call processing, reducing traffic on the network. Instead of communicating the entire profile, a subscriber designator or other information designating the selected profile is communicated from an SSP, SCP or other call routing equipment.

The first profile 502 stores information defining an announcement to play and routing directions and other information. As noted, the announcement play may be stored as a recorded message, recorded by the subscriber, one or more canned messages or standard, predefined messages, or text which may be provided directly to a caller or process in a text to speech system for audible provision to the caller. The routing direction of the profile 502 define menu selections which may be provided by the caller and associated destinations or terminating numbers to which a call may be routed. These terminating numbers may correspond to voice mail systems, other land line telephone numbers, cellular numbers, pagers, facsimile numbers and other numbers associated with the subscriber. The second profile 504 stores a subscriber's speech recognition or interactive voice response (IVR) and menu choice information for routing calls using customized announcements. The second profile 504 also stores a routing schedule based on time of day. A schedule may be established by a subscriber and stored as part of the customer profile 504. Call routing menu options are provided based on the routing schedule as well as the other menu information provided by the subscriber.

The method embodied in FIG. 4 may be implemented in a telecommunication system which includes a network element configured to process a call from a calling party, the call having an associated terminating number. In one embodiment, the network element is a service node which also may be configured as a compact service node (CSN). In another embodiment, the network element may be an intelligent peripheral (IP). The terminating number is preferably the directory number or telephone number associated with the called party. The telecommunication system further includes a first computer readable program code which controls the network element to retrieve a subscriber profile of the calling party based on the terminating number. A second program code controls the network element to play a subscriber defined announcement of call routing options. A third program code detects a menu selection of the calling party and a fourth program code communicates call routing information from the network element to call routing equipment of telecommunication systems, such as a terminating switch and an originating switch. In one embodiment, the telecommunication system further include an originating SSP, and SCP and a terminating SSP, all in communication with the service node or other network element. In an alternative embodiment, no SCP is provided and the telecommunication system includes only an originating SSP, a terminating SSP and the service node or other network element, all in data communication.

Figure 6:
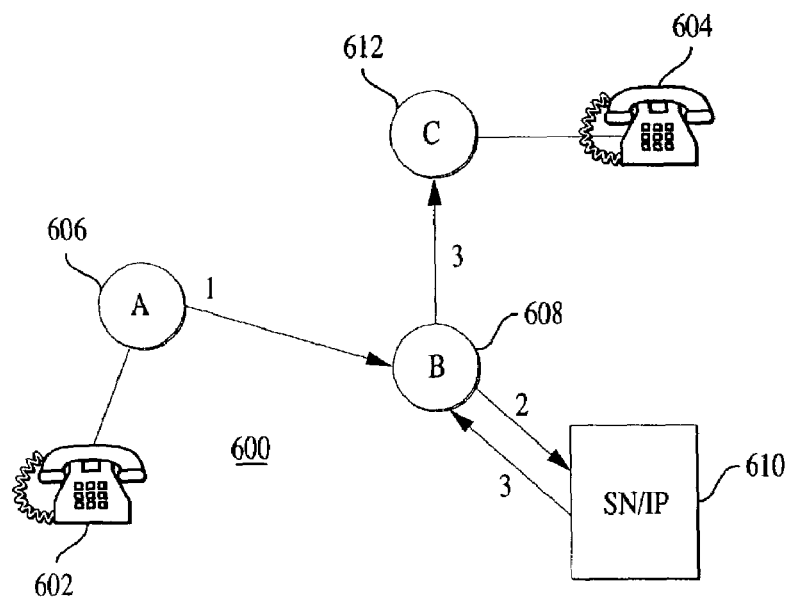
FIG. 6 is a block diagram of a telecommunication system illustrating a prior art call flow.

FIG. 6 is a block diagram of the telecommunication system 600 illustrating a prior art call flow. The system 600 includes a calling communication station or telephone 602, a called communication station or telephone 604, an originating switch or SSP 606, an SSP 608, a service node or intelligent peripheral (SN/IP) 610 and a terminating switch or SSP 612. For routing a call from the calling communication station 602 to the called communication station 604, the calling party at telephone 602 places a call which is detected at the originating SSP 606. Information about the call is routed (1) to the end office or SSP 608 associated with the SN/IP 610. The call is routed (2) to the SN/IP 610. The service logic of the SN/IP 610 plays a message to the calling communication station 602 and collects digits to determine where the call should be routed to. Upon receiving this menu selection, the SN/IP 610 places an outbound call (3) to the routed destination, in this case terminating SSP 612. The call may be tied together within the SN/IP 610 or transferred to the service node end office 608 using common switch features.

While effective at conveying call routing menu options and collecting call routing menu choices, this prior art technique has the disadvantage of needlessly tying up the SN/IP 610 and its associated end office switch 608 during the ongoing call between the originating SSP 606 and the terminating SSP 612. This tends to limit traffic flow and flexibility in the network 600.

Figure 7:
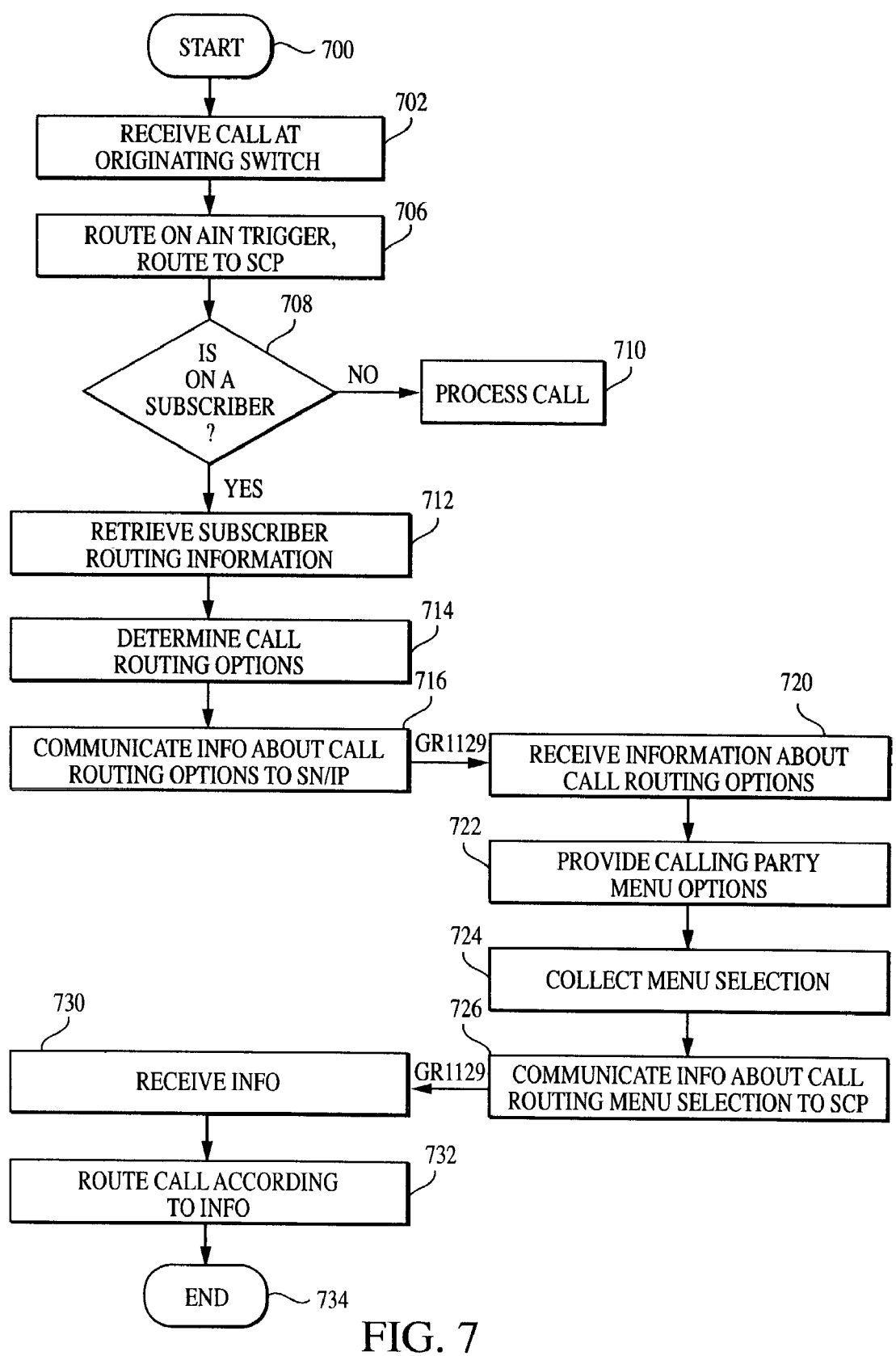
FIG. 7 is a flow diagram illustrating another embodiment of a method for operating the telecommunication system of FIG. 1.
Figure 8:
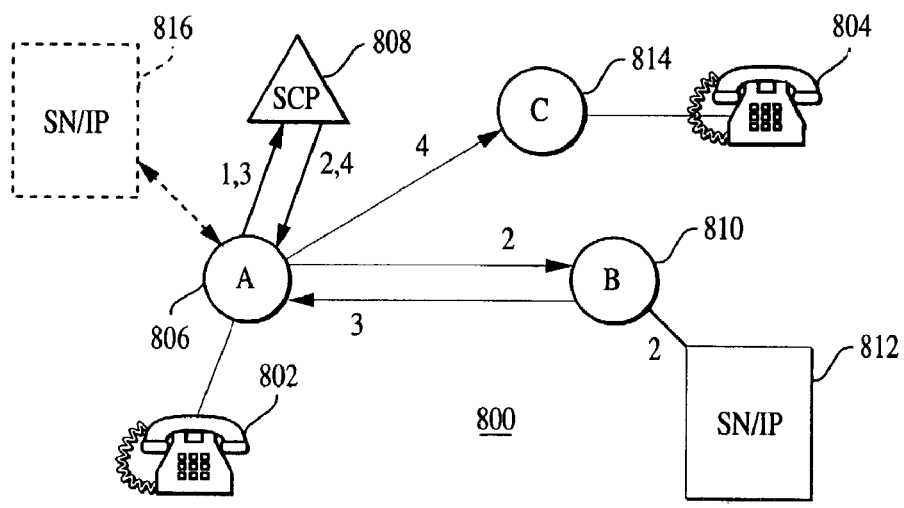
FIG. 8 is a block diagram of a telecommunication system illustrating call flow in accordance with the embodiment of FIG. 7.

FIG. 7 is a flow diagram illustrating another embodiment of a method for operating a telecommunication system. FIG. 8 is a block diagram of a telecommunication system 800 illustrating call flow in accordance with the embodiment of FIG. 7. The method embodied in FIG. 7 will be described in conjunction with FIG. 8. The system 800 includes a calling communication station 802, a called communication station 804, an originating end office switch or SSP 806, an SCP 808, an SSP or end office switch 810, a service node/intelligent peripheral (SN/IP) 812 linked to the SSP 810, and a terminating end office switch or SSP 814. In alternative embodiments, the system 800 could also include a SN/IP 816 linked to or associated with the SSP 806. The functions performed by the SN/IP 812 as described herein may be performed alternatively by the optional SN/IP 816 or by similar equipment located at any location in the system 800.

The method of FIG. 7 begins at block 700. At block 702, a call from the calling communication station 802 is received at the originating switch, SSP 806. Preferably, AIN triggers such as an on-hook delay (OHD) trigger are placed on the dialed digits to route (1) the call to the SCP 808, block 706. At block 708, it is determined if the called party associated with the directory number of the call is a subscriber to the service. If not, at block 710 the call is processed normally. However, if a called party is a subscriber, at block 712 the subscriber routing information is retrieved.

At block 714, call routing options for the subscriber are determined at the SCP 808. Preferably, the subscriber profile and its associated call routing options and other information are stored at the SCP, such as in an SCP database, not shown in FIG. 8. At block 716, the SCP 808 communicates (2) information about the call routing options based on the subscriber profile to the SN/IP 812. In accordance with one embodiment of FIG. 8, the communication is made in using the GR1129 data communication protocol.

At block 720, the SN/IP 812 receives the information about call routing options. The SN/IP processes this information to establish a message to be played to the calling party at the calling communications station 802. The message defines a menu of options for call routing to permit the calling party to locate or provide a message for the called party. At block 722, the message is played (2) for example by converting text to audible speech or by playing a prerecorded message established by the subscriber, or by playing a standard, canned message selected by the subscriber to be played to the calling party at the calling communication station 802. At block 724, the SN/IP 812 collects the menu choice entered by the calling party, for example by detecting a spoken response and converting the spoken response to digital data or by detecting DTMF tones entered at a keypad of the calling communication station 804.

At block 726, the SN/IP 812 communicates (3) information about the call routing menu selection made from the calling communication system 802 to the SCP 808. The information is passed to the SCP 808 for use by the call routing logic of the SCP 808. In accordance with one embodiment of FIG.8, this information is communicated using the GR1129 protocol. At block 730, the SCP 808 receives the selected call routing menu option information. At block 732, the call is routed according to this information. That is, the SCP 808 returns (4) to the originating SSP 806 information to define the terminating SSP 814 associated with the called communication station selected by the calling party and communicated in the menu selection. The originating SSP 806 routes (4) the call to the called communications station through the terminating SSP 814. The method ends at block 734.

As noted above, in one embodiment of the method of FIG. 7 and the system of FIG. 8, data is communicated in accordance with the GR 1129 protocol. Among other provisions, GR 1129 directs that communications between an SCP and a SN/IP travel through an SSP. This method of communication between the network elements of an AIN permits the SSP to keep track of billing records and to release the SSP-IP voice/data connection when it is no longer required while maintaining control of the original call. Additionally, the SSP can receive subsequent call processing instructions from the SCP for the same call as part of the same initial transaction.

The application described herein of GR 1129 to call routing operations is unique. Heretofore, two methods existed for providing customized call routing based on providing the called a menu. In the first method, a call is routed to a service node (SN) which has the necessary service logic and plays announcements and collects digits from the caller, the service node eventually routing the call back to the network, but only as far as the end office switch associated with the SN/IP. This is illustrated in the prior art embodiment of FIG. 6. This option allows the system to make full advantage of the SN/IP capabilities, including customized announcements, text-to-speech conversion, speech recognition, etc. However, this technique has a disadvantage of inefficiency in routing in the network, as described above. A second method involves using GR 1129 with an SCP and an IP or other peripheral. In this case, the surface logic which controls call routing is in the SCP which uses the IP as a resource. This has the advantage of routing the call more efficiently by using the AIN SCP. AIN triggers such as TAT and SDS can be used to stop and route the call more efficiently than simply using SSP-SSP call routing. However, the scope of the GR 1129 protocol limits how much of the SN/IP functionality can be utilized. For example, the full range of programming capabilities on the SN/IP cannot be used in some applications. This can mean that mixing and matching technologies, such as text-to-speech, speech recognition, digit outpulse, etc., cannot be done.

Figure 9:
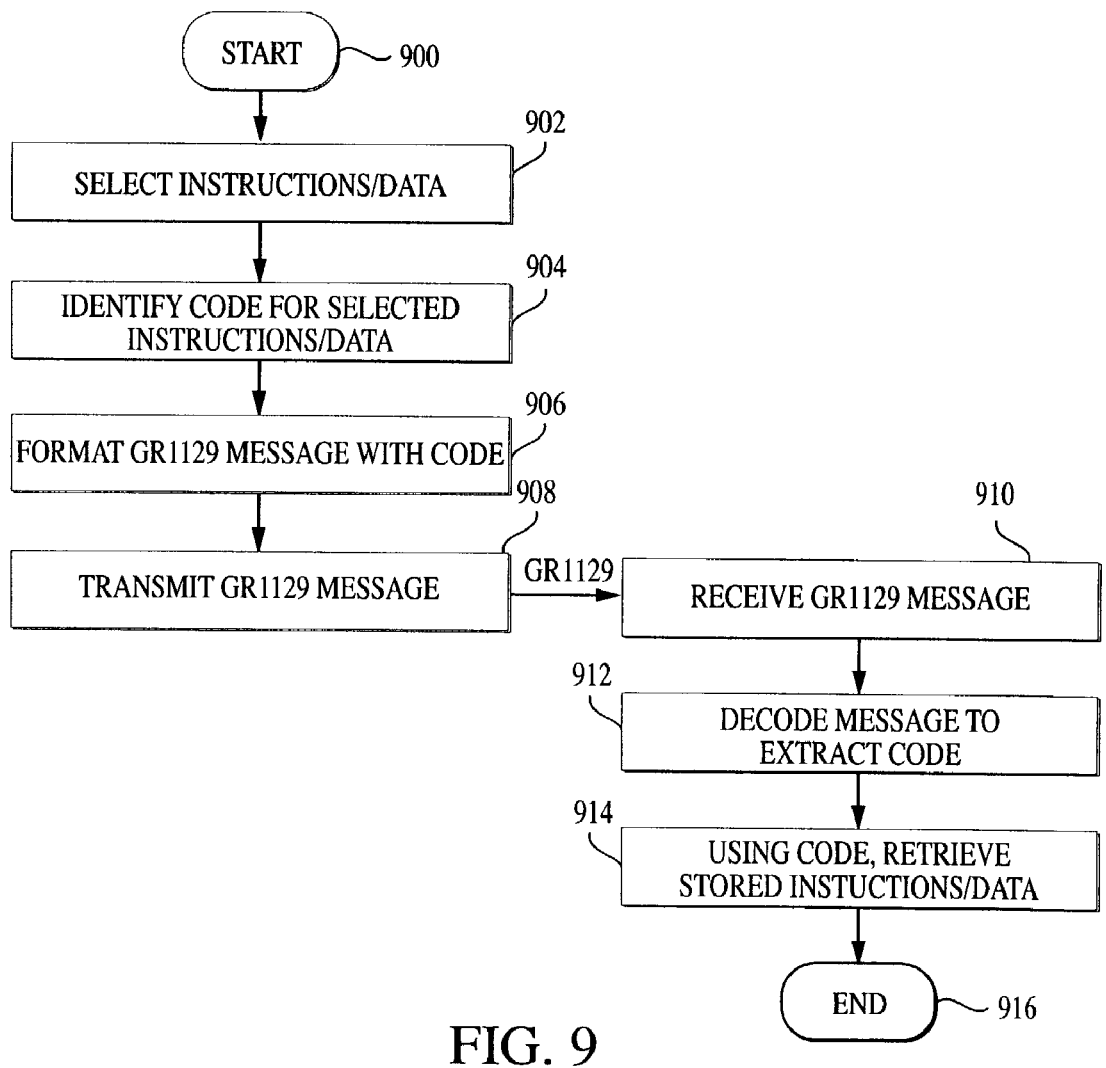
FIG. 9 is a flow diagram illustrating an embodiment of a method for operating the telecommunication system of FIG. 8.

FIG. 9 is a flow diagram illustrating an embodiment of a method for operating a telecommunications system to overcome these difficulties and incorporate GR 1129 signaling in a call routing method as described herein. In accordance with this embodiment, an application or series of program instructions can be invoked on an SN/IP of the network based on an encrypted message in the GR 1129 protocol received from another network element of the network. For example, a message which instructs the SN/IP to "play announcement number 27" might be coded on the SN/IP to "invoke application number 3201" which can use the full range of the SN/IP's programming and functionality, such as speech recognition, text-to-speech conversion and so forth. When the SN/IP is finished with its application, it returns a result in the resource_clear message to the SCP, part of GR 1129. The resource_clear message itself could also be encrypted to have another meaning. For example, if the SN/IP returns a resource_clear message indicating that the caller entered the digits "1, 2, 3", the SCP may convert this data to an indication that corresponds to routing the call to a predetermined number, changing the calling party identifier to another data element. Thus, this embodiment provides the advantages of full use of the SN/IP resources and the more efficient networking routing of GR 1129.

An exemplary embodiment of this process is shown in FIG. 9. The method of FIG. 9 begins at block 900. At block 902, instructions or data to be executed at the remote end of an AIN communication connection are selected. In one example used herein, the instructions and data correspond to those necessary to implement a subscriber profile for customized call routing based on providing a menu of options to a caller. In this embodiment, the instructions include the types of announcements to play to the caller, and the types of menu options to expect or to receive from the caller. The data include the content of the message to be played and the corresponding menu options to provide.

At block 904, a code is identified at the local end of the GR 1129 connection for the selected instructions and data. This may be done in any suitable manner. For example, a look-up table procedure may be used in which the selected instructions or data are provided to a table to extract a table value which may be used for transmission of a GR 1129 message. Alternatively, an instruction code may be inserted in a GR 1129 message for subsequent decoding. At block 906, the GR 1129 message is formatted. Formatting includes encoding the identified code in the message as well as providing necessary header data, footer data and other data required to form a complete GR 1129 message. At block 908, the GR 1129 message is communicated from the local end to the remote end of the AIN communication connection. In the illustrated embodiment, this transmission is from an SCP to a SN/IP or the reverse path, from the SN/IP to an SCP. However, the communication could occur between any components from the AIN network or any other suitable components.

At block 910, the encoded GR 1129 message is received at the remote end of the connection. At block 912, the message is decoded to extract the code which defines the necessary instructions and data. At block 914, using the code, the stored data and instructions are retrieved. This may be done in any appropriate method, such as by applying the extracted code to a look-up table to identify a portion of code or an application or series of programming instructions which may be invoked at the remote end of the communication connection such as the SN/IP. Any decryption, decoding or extraction method may be used to retrieve the encoded data. The message ends at block 916.

Thus, the embodiments described herein illustrate a call routing method in an advanced intelligent network. The method includes, at an originating switch, receiving a call from a calling communications station for a directory number (DN). Data about the call is communicated to a service control point and subscriber routing information associated with the DN is retrieved. In response to the subscriber routing information, an interactive communication is initiated between an intelligent peripheral or service node or SN/IP of the AIN and the calling communication station. Information about call routing data is received from the calling communication station and communicated from the IP to the SCP. In response to this information, the call is routed from the originating switch to a terminating switch. In one embodiment, the communication between the SCP and the IP is according to the GR 1129 protocol. Further, the method includes communication by encrypting data or instructions in a message of the GR 1129 protocol and decrypting the message to extract the data or instructions.

Another embodiment disclosed herein includes a call routing method in an Advanced Intelligent Network. The method includes receiving a call from a calling party for a called party at an originating switch. In response to a trigger on the call, data about the call is sent from the originating switch to a service control point (SCP). At the SCP, call routing option data are retrieved for the called party. In response to this call routing option data, an intelligent peripheral is activated to provide one or more menu options and receive one or more menu choices from the calling party. Information about the one or more menu choices is provided from the IP to the SCP and, in response, the call is routed from the originating switch to a terminating switch. In one embodiment, at the SCP, a plurality of command instructions for the IP are encrypted at the SCP. At the IP, the command instructions are in turn decrypted and executed. In this embodiment, encrypting the plurality of command instructions includes formatting a GR 1129 message with code data indicative of the plurality of command instructions for retrieval at the IP.

Another embodiment discloses a data communication method for an Advanced Intelligent network. The method includes receiving a GR 1129 message containing a selected code. Using the selected code, data for program instructions or both are retrieved from storage. The retrieved data or instructions are then executed. This may be implemented in an Advanced Intelligent Network which includes a first network element, a second network element in communication with the first network element using GR 1129 protocol and a program code stored at the second network element and selectable in response to a code included in a GR 1129 message. In one embodiment, the second network element includes a memory and a processor configured to execute instructions stored in the memory including the program code upon receipt of the code. The memory may include a table indexed by the code.

Figure 10:
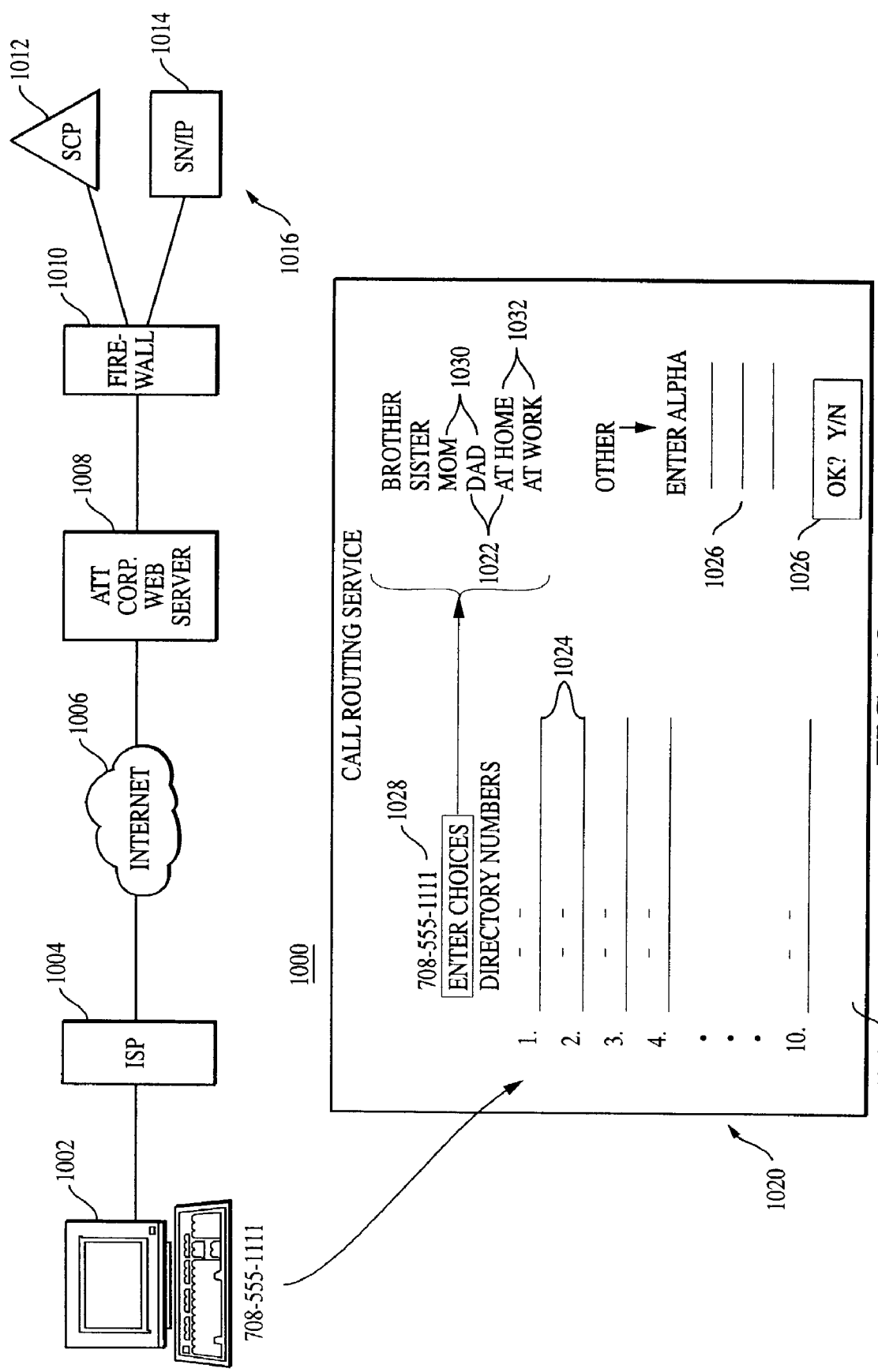
FIG. 10 is a block diagram of a telecommunication system.

FIG. 10 is a block diagram of a telecommunication system 1000. FIG. 10 illustrates one embodiment of a method and a system for providing a menu of subscriber specific call routing choices. In current systems, call routing information stored in a telecommunication system is updated via an interactive voice response interface or via the service management system user screens. While these techniques have been successful, a system is desired which is simpler to use, provides greater flexibility for the subscriber, and improves access to the service.

The embodiment of FIG. 10 provides a World Wide Web interface where the user can populate the dialed digits and select from pre-recorded voice files that associate the number to a spoken name or place. An example might be associating the text or voice file containing data for "Mom's Office" and the telephone number (708) 555-3232. The end result, after presentation of a menu of options including this one, would be that the caller presses a number such as one on the key pad after hearing the menu including the choice of "call Mom's Office." In one embodiment, the corresponding telephone number is not provided or not accessible to the calling party. Only a text or audible message identifying the menu option is provided to the caller. This maintains a level of privacy that may be desired by some subscribers.

Preferably the call routing information is established and updated using a World Wide Web server implemented on a device such as a personal computer, wireless device such as a cellular or other radio telephone, etc. A message containing the new or updated information is conveyed, for example, using TCP/IP protocol over the Internet. The web browser can access a home page or other screen to answer questions or complete data fields which define the updated or new call routing information. In this manner, the subscriber can easily modify the parameters of the call routing service that presides on a SCP or on a service node or on an IP. This service requires creation of a generic blank subscription based on a service order prior to inserting or modifying the data.

In FIG. 10, the system 1000 includes a personal computer or other remote device 1002, an Internet service provider (ISP) system 1004 which provides access to the Internet 1006, a web server 1008 provided by the telecommunication service provider, a firewall 1010 which isolates components of the telecommunication system from the Internet, an SCP 1012 and a SN/IP 1014 and other components of a telecommunication system 1016. The telecommunication system in the illustrated embodiment includes AIN elements such as the SCP 1012 and SN/IP 1014. Other types of components may be included as well to provide telecommunication service to a calling party who seeks to place a call to a called party. The called party in the illustrated embodiment subscribes to a service which permits customized call routing based on providing a menu of call routing options to the caller.

The subscriber operates the device 1002 to access a web browser such as Internet Explorer provided by Microsoft Corporation or Netscape Navigator provided by Netscape Corporation. The device 1002 provides wireless or wireline access to facilities of an Internet service provider 1004. The Internet service provider 1004 in turn provides access over the Internet 1006 to remote service devices, including the web server 1008 of the telecommunication service provider. As is known in the art, communication over the Internet between the device 1002 and the web server 1008 is according to transmission control protocol/internet protocol (TCP/IP). According to this protocol, a message of one or more packets is formatted and transmitted and routed from the origin to the destination over the Internet 1006. The one or more packets are re-assembled into a complete message at the destination 1008 and the message is interpreted. In this manner, the subscriber operating the device 1002 may submit call routing menu information to the web server 1008.

The firewall 1010 provides isolation between the components of the telecommunication network 1016 and the Internet 1006. The firewall 1010 prevents inadvertent access to those components but permits controlled access for updating information stored, for example, at the SCP 1012 or the SN/IP 1014. Either under control of the web server 1008 or other devices associated with the telecommunication network 1016, call routing information received at the web server 1008 may be used to update call routing data included in a subscriber profile and stored at the SCP 1012 or the SN/IP 1014. In this manner, update information received over the Internet 1006 at the web server 1008 from a subscriber using the device 1002 may be verified for accuracy and completion and used to insert or modify the data stored in the network 1016.

FIG. 10 also illustrates one embodiment of a user interface 1018 which may be displayed on the device 1002 for use by the subscriber to insert or modify call routing data in the telecommunication network 1016. The user interface 1018 in the illustrated embodiment is arranged as a World Wide Web display 1020 including one or more call termination option fields 1022 and one or more telephone number fields 1024. Each telephone number field corresponds to one or more call destination options. The display 1020 further includes a select button 1026. The subscriber may use a mouse, stylus or other pointing device to maneuver through the display 1020. Telephone numbers may be entered in the telephone number fields 1024. The call termination option fields 1022 may be clicked or otherwise selected to associate a call termination option field with a telephone number field.

After the association has been made, the subscriber clicks the select button 1026. In response to this action, the device 1002 formats a TCP/IP message including data representative of the entered directory numbers or telephone numbers and the selected call termination option information. The device 1002 transmits the message as one or more TCP/IP packets to the Internet service provider 1004. Equipment of the internet service provider 1004 communicates the message over the Internet 1006 to the web server 1008. The web server 1008 collects the TCP/IP packets and extracts the telephone number field information and call termination option information. The web server 1008 or another device formats the information into a subscriber profile. The subscriber profile is communicated within the network 1016 and subscriber profile data are stored at one of the SCP 1012 and SN/IP 1014 for in multiple locations.

For updating information already provided and stored in a subscriber profile, the subscriber operating the device 1002 may access the web server 1008 over the Internet 1006 and retrieve information about the subscriber profile. In this example, the user interface 1018 includes a display 1020 on which a previously stored telephone number 1028 is displayed. Using a mouse, stylus or other pointing device, the user may update this information. For example, the stored number may be deleted, the number may be changed or corrected, or its association with a call termination option field 1022 may be changed. The call termination options in the illustrative embodiment include clickable call destination buttons 1032, which specify destinations such as "home" and "work," and clickable called party buttons 1030 which specify a particular called party such as "brother" and "mom".

The TCP/IP messages communicated between the device 1002 and the web server 1008 preferably include a subscription number or other identifying information for the subscriber and the selections of the subscriber. Prerecorded names and places associated with the clickable call destination buttons 1032 and clickable called party buttons 1030 correspond to announcement identifiers already populated at the SN/IP 1014 and the SCP 1012. The user interface also includes an alpha entry field 1026 which may be filled with data defining a location, an individual or other text message to be delivered to a caller. Text stored in the alpha field 1026 invokes a text-to-speech operation of the SN/IP or other network element.

Figure 11:
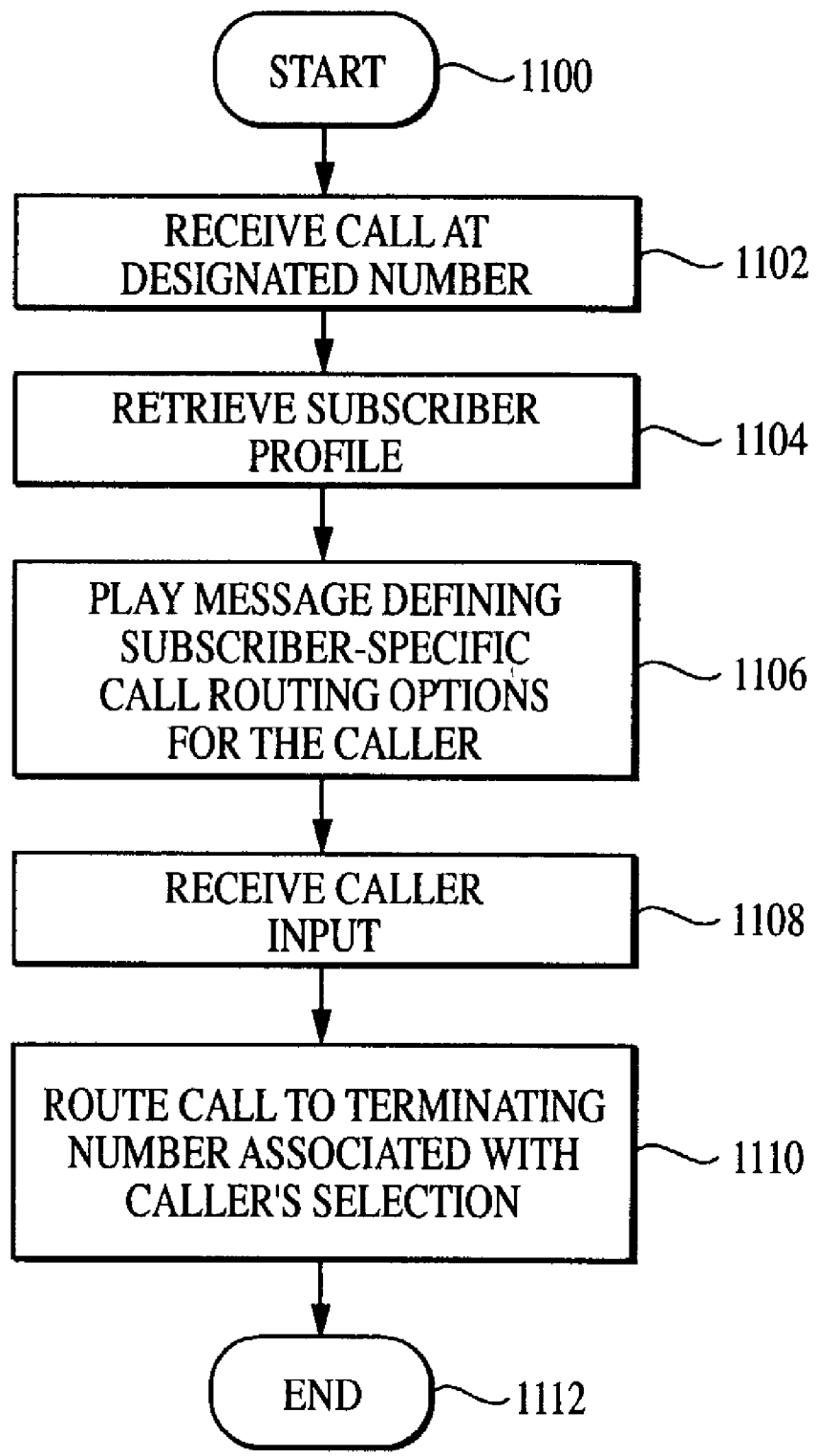
FIG. 11 is a flow diagram illustrating another embodiment of a method for operating the telecommunication system of FIG. 1.

FIG. 11 is a flow diagram illustrating another embodiment of a method for operating the telecommunication system of FIG. 1. The embodiment of FIG. 11 illustrates one method for implementing a "find me" service. In accordance with the embodiment of FIG. 11, a caller dials a designated number such as a toll free or 800 telephone number or another local number that would route the call to a platform. An example of a platform is a service node or an intelligent peripheral (IP) of an AIN network. This platform would have an interactive voice response apparatus that would allow the caller to reach the subscriber of the service at any of the numbers the subscriber has chosen. For example, the following message might be played to the caller. "If you would like to reach your party at work, press 1. If you would like to reach your party at home, press 2. If you would like to try her cell phone, press 3. If you would like to have her paged, press 4. If you would like to send her a fax, press 5." Upon receipt of a menu selection by the caller, the call will be routed in accordance with the selection.

The method of FIG. 11 begins at block 1100. At block 1102, a call is received at a designated number. As noted, in one example, the designated number is an 800 or other toll free number assigned to the subscriber or to the service. In one example, the service is accessed by dialing a toll free number, and a subscriber identifier or PIN number is entered to access the subscriber profile for the desired called party.

At block 1104, the system retrieves the subscriber profile associated with the subscriber of the service. At block 1106, a message defining the subscriber's specific call routing options is played for the caller. This may be done in any appropriate manner. In one example, the network makes use of the capabilities of a service node or intelligent peripheral to provide announcement playback. At block 1108, the caller input is received in response to the message options provided. At block 1110, the call is routed to the terminating number associated with the caller selection. For example, if the caller selection corresponds to a home telephone number of a subscriber, the call is routed to the switch or SSP associated with that terminating number. Further, if the caller input corresponds to a number outside the telecommunication network, the call will be routed to that number as well. An example of this is a number associated with a cellular or other radiotelephone account of the subscriber. In this case, the call is routed outside the telecommunication network to the radio telephone system, and through the mobile telephone switching center or other equipment of the radiotelephone system to communicate a wireless message seeking to locate the radiotelephone of the subscriber. The method ends at block 1112.

Thus, a method in accordance with the embodiment of FIG. 11 includes receiving a call from a caller, the call including a subscriber identifier. As noted, the subscriber identifier may be the designated number such as the toll free number associated with the subscriber. Alternatively, the subscriber identifier may be a PIN number or a subscriber number to be entered upon accessing the service. The method further includes identifying a service subscriber associated with the subscriber identifier and retrieving a subscriber profile of the service subscriber including a list of call routing options and a subscriber-specific message for playback to the caller. This subscriber specific message is played to the caller and a caller routing indication is received from the caller. The call is then routed to a terminating directory number associated with the call routing indication. Retrieving the plurality of listings may include, in one embodiment, retrieving one or more listings of terminating directory numbers associated with the first telecommunication network, such as a wire line network and retrieving one or more listings of terminating directory numbers associated with a second telecommunication network, such as a cellular telephone network. Then, processing the call includes routing the call from the first telecommunication network to the second telecommunication network.

Figure 12:
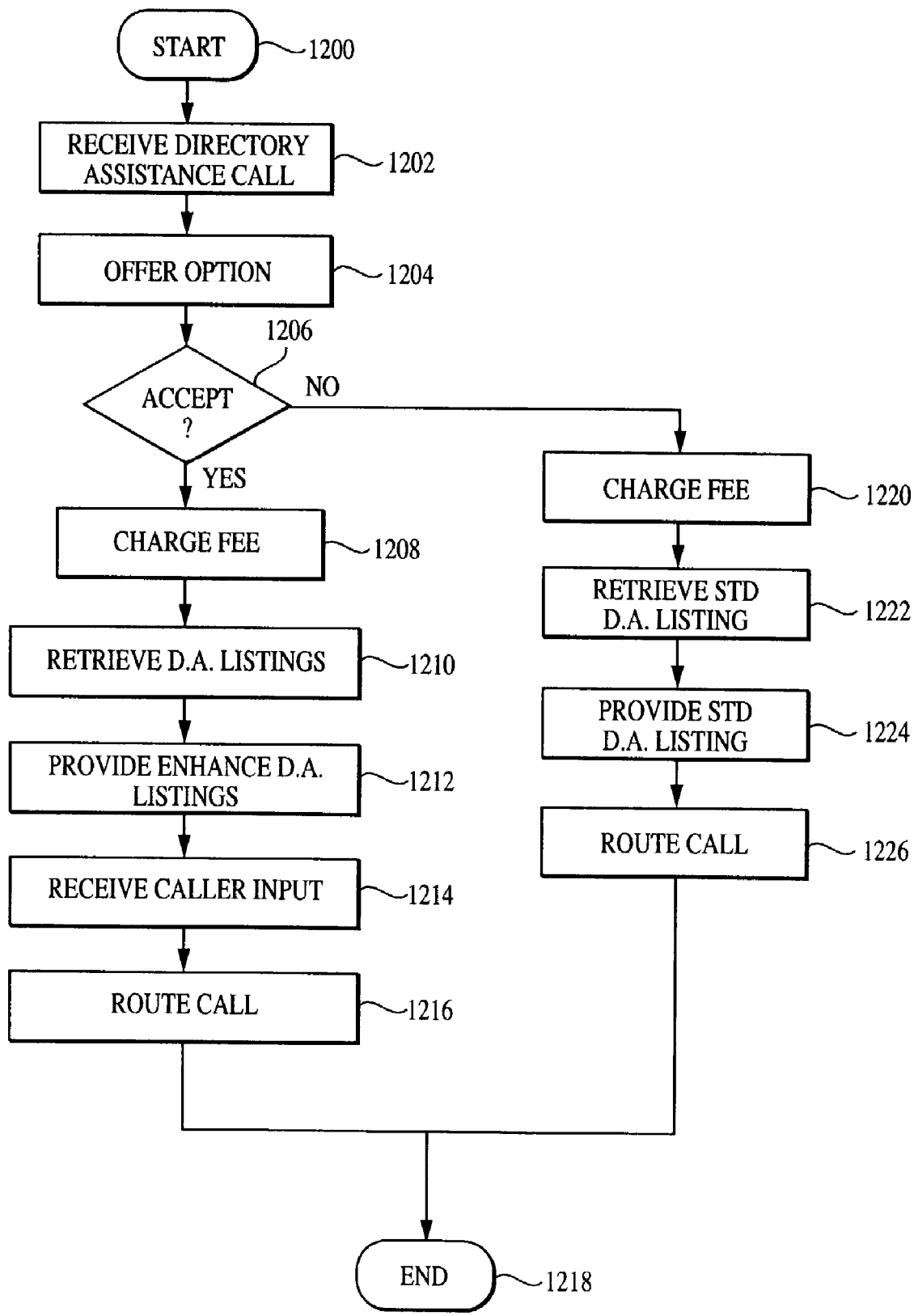
FIG. 12 is a flow diagram illustrating another embodiment of a method for operating the telecommunication system of FIG. 1.

FIG. 12 is a flow diagram illustrating another embodiment of a method for operating the telecommunications system of FIG. 1. FIG. 12 illustrates another way to execute a "find me" service. In this embodiment, the service is provided by expanding the listing for a subscriber in directory assistance. Subscribers may expand their listing, for a fee or at no additional charge, to include cellular, pager and facsimile numbers. The caller calling directory assistance is, for no fee or for a normal directory assistance charge, able to get what ever number or numbers associated with the called party are desired. This has the benefit of stimulating additional usage of the directory assistance service provided by a telecommunication service provider.

In FIG. 12, the method begins at block 1200. At block 1202, a telecommunication system receives a directory assistance call. In general, the directory assistance call is directed to a directory assistance number, such as 411 or 555-1212 and is from a caller seeking directory assistance for a called party in general and in particular for a service subscriber. At block 1204, an option to receive expanded directory assistance listings is offered to the caller. At block 1206, it is determined if the caller selects the option. For example, at block 1204, the option may be offered by providing an audible greeting and instructions including the request to select or press a first key if the option is selected or to press a second key if the option is not selected. At block 1206, the key press is detected and acceptance is determined.

At block 1208, in accordance with one embodiment, a fee is charged to the caller for accessing the expanded directory assistance listings. The fee may be charged, for example, by debiting an account of the caller maintained with the telecommunications service provider. At block 1210, the expanded directory assistance listings are retrieved. At block 1212, the enhanced directory assistance listings are provided to the caller. At block 1214, the caller input is received and at block 1216, the call is routed in accordance with the caller input. The method ends at block 1218.

At block 1220, in one embodiment, a standard directory assistance fee is charged of the caller. This may be done in any suitable manner, such as deducting the fee amount from an account maintained by the caller with the provider of the telecommunication service. At block 1222, the standard directory assistance listing for the called party is retrieved. Typically, a standard directory assistance listing includes a single terminating number, such as the home telephone number for the called party. At block 1224, the standard directory assistance listing is provided and at block 1226 the call is routed in accordance with caller input. For example, at block 1224, the caller might be invited to complete a call to the provided number associated with the standard directory assistance listing by pressing, for example, 1 on the keypad. If this input is received, the call is routed accordingly. If no input is received, the call is terminated or cancelled. The method ends at block 1218.

Thus, in accordance with the method embodiment illustrated in FIG. 12, a telecommunication method includes receiving a directory assistance call from a caller and retrieving a plurality of listings for a service subscriber. A menu of call routing options including the listings of the plurality of listings is provided to the caller and a menu selection is received from the caller. The call is then routed according to the menu selection. The retrieved listings may include a land line telephone listing, a land line facsimile listing, a cellular telephone listing of the service subscriber, a pager listing or a voice mail listing of the service subscriber. In one embodiment, the caller is charged a fee upon retrieving a plurality of listings. Alternatively, the fee may be charged at any time during the process. In another embodiment, the caller is given an option to receive a single listing or a plurality of listings associated with the called party or service subscriber and the caller is charged a fee only upon retrieving the plurality of listings. In another embodiment, the service subscriber is charged a fee. In this embodiment, the fee may be charged upon receiving the plurality of listings or at any time during the processing the directory assistance call. In another embodiment, the fee may be charged to a service subscriber upon receiving the plurality of listings and setting up the enhanced directory assistance account.

Figure 13:
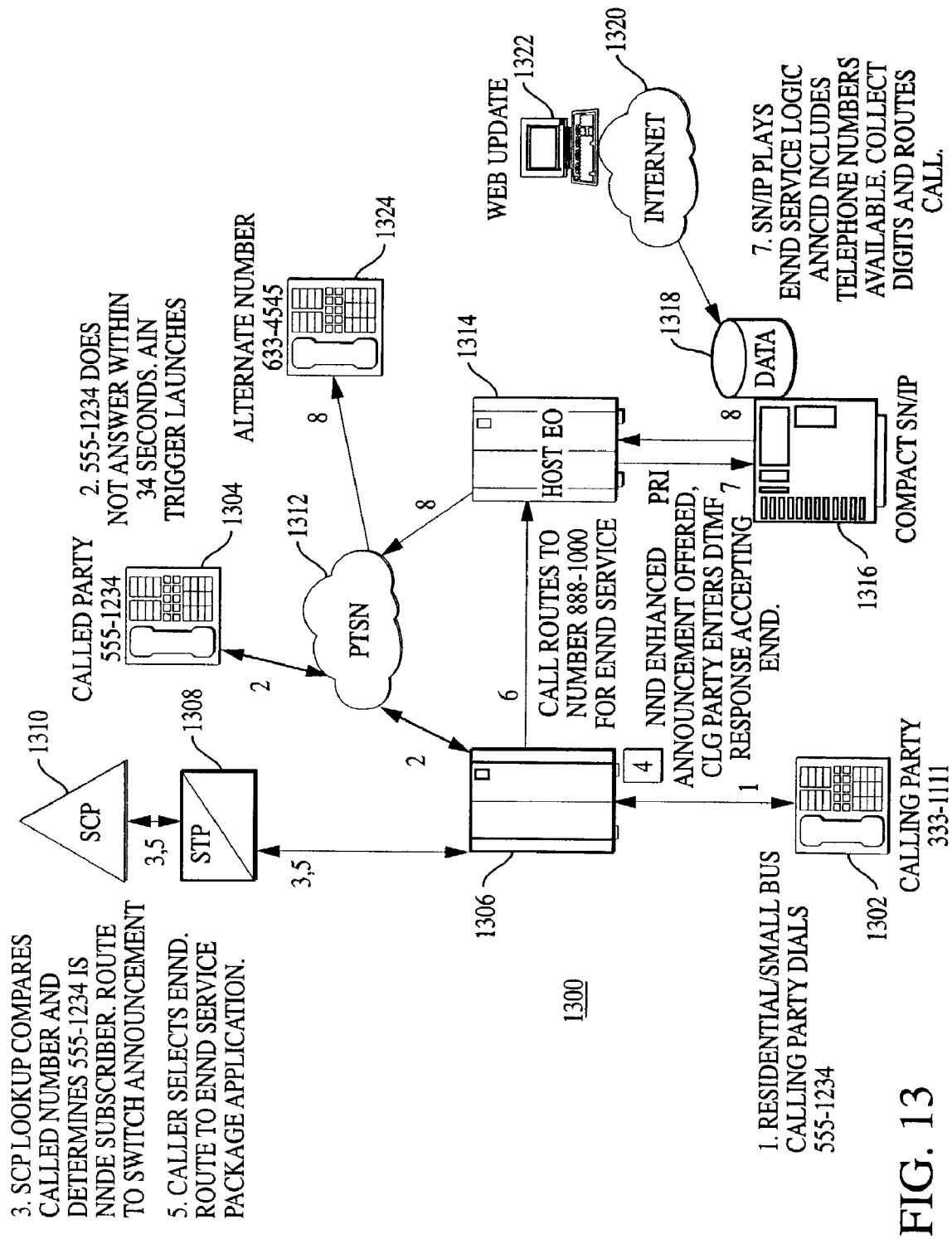
FIG. 13 is a block diagram of a telecommunication system.
Figure 14:
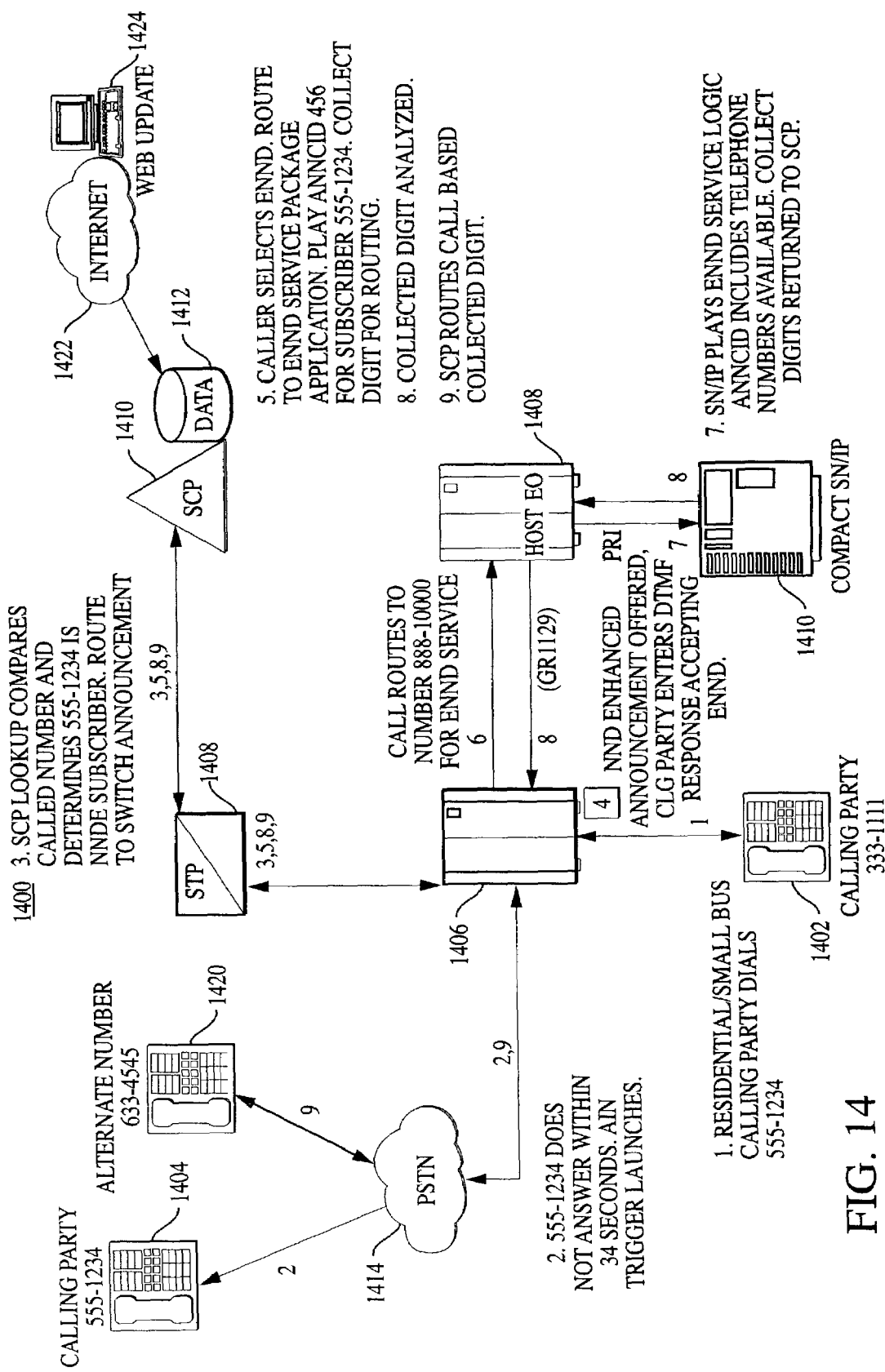
FIG. 14 is a block diagram of a telecommunication system.

FIGS. 13 and 14 are block diagrams of telecommunications systems. These figures illustrate alternate embodiments of methods to execute a "find me" service. This embodiment involves a pay-per-use (PPU) service that is activated when the called party does not answer the call. In this version of the service, once the call reaches the service node, intelligent peripheral or other platform, a message is provided to the caller such as "the person you are trying to reach is currently not available. If you would like to leave a message for them, press 1 now." This option routes the caller to the called party's voice mail. In this embodiment, the message continues "for a 75 cent charge, you can try to reach the called party at additional numbers they have listed for themselves. If you would like to try to reach the party you are calling at one of these additional numbers, press 2 now." The calling party is then offered any other numbers or a subset of numbers listed in directory assistance for the called party. The call is placed to whatever number or numbers the calling party selects. In one embodiment, numbers can be contacted sequentially, either using a default sequence or a sequence specified by the service subscriber in a subscriber profile. In another embodiment, the numbers can be contacted simultaneously. All numbers associated with the subscriber can be contacted simultaneously or a subset of numbers associated with the subscriber can be contacted simultaneously. The subscriber may specify the numbers to be used when contacting sequentially or simultaneously, and may specify a subset of numbers to be used when processing a call from this calling party or a group including this calling party.

FIG. 13 illustrates one embodiment of this method in conjunction with a telecommunications system 1300. The system 1300 includes a calling communications station 1302, a called communications station 1304 and an end office switch or SSP 1306, a signaling transfer point (STP) 1308 and an SCP 1310. A public switched telephone network (PSTN) 1312 links these components to a terminating end office switch or SSP 1314, a service node/intelligent peripheral (SN/IP) 1316, including its associated database 1318. The database may be accessed, for example, over the Internet 1320 by a remote device 1322 for updating subscriber profile information contained in the database 1318. An alternate terminating number or called device 1324 is also accessed over the PSTN 1312.

The method begins when the calling party dials the terminating directory number associated with the called communications station 1304, 555-1234 in the example of FIG. 13. The call is received (1) at the originating SSP 1306. The call is routed (2) through the PSTN 1312 to the called communication station with the terminating directory number, which rings. In accordance with the present embodiment, the system waits a predetermined time, such as 34 seconds, to determine if the called communication station 1304 is answered. If the station 1304 is answered, the call is processed normally. However, if the communication station 1304 is not answered, an AIN trigger is encountered which generates a query to the SCP 1310. The query is routed (3) from the SSP 1306 through the STP 1308 to the SCP 1310. The SCP performs a look-up operation to determine if the called party associated with the terminating directory number is a subscriber to the enhanced name and number delivery service. If not, call processing continues as normal. If the called party is a subscriber, the call is routed to the switch, SSP 1306, for announcement (4) of the service.

The SSP 1306 announces the service and offers menu options to select the service. The caller selection is routed (5) to the SCP for further processing. In response, the call is routed (6) to a number associated with the end office or SSP 1314 associated with the SN/IP which will provide the interactive menu process. The SN/IP plays (7) the service logic to produce the announcement and collects digits and routes. The announcement may be played in any manner described herein, including a text-to-speech process, playing of canned messages or pre-recorded subscriber messages. Caller input and menu selection may be achieved in any method as described herein, including detecting DTMF tones, or voice recognition operation. The SN/IP 1316 accesses the subscriber profile stored in the database 1318 to determine the menu options to provide to the calling party and the directory numbers and call routing option. The SN/IP 1316 determines the appropriate route and terminating number in response to the menu selection received from the calling party at the calling communication station 1302 and in response to the subscriber profile stored in the database 1318. The route is returned (8) to the end office or SSP 1314 associated with the SN/IP 1316. The end office 1318 routes the call (8) through the PSTN 1312 to the alternate terminating number 1324.

In accordance with another embodiment, the subscriber may update subscriber profile information using a remote device 1322, such as a personal computer. The subscriber may access the call routing information stored in the SN/IP database 1318 over the Internet 1320. This may be done in accordance with the embodiments described herein or in accordance with any other suitable embodiment or method.

FIG. 14 illustrates another embodiment for implementing a pay-per-use (PPU) find me service using GR 1129 communication protocol in a telecommunication system 1400. In the telecommunication system 1400, a calling party at a calling communications station 1402 dials the terminating directory number associated with a called communications station 1304, 555-1234 in the example of FIG. 14. The call is routed (1) to an originating switch or SSP 1406 for processing. The switch 1406 routes the call over at the PSTN 1414 to the called communications station 1404 (2). After a predetermined time, such as 34 seconds, the switch 1406 determines that the called communications station 1404 is not answered. In response, the switch 1406 encounters a trigger and launches a query to the SCP 1410. The query is routed (3) through the STP 1408 to the SCP 1410. In response to the query, the SCP determines if the called party associated with the called communications system is a subscriber to the enhanced name and number delivery service. If not, call processing continues as normal.

If the called party is a subscriber, the call is routed (5) to the originating switch 1406 to provide an announcement (4) to the calling party offering the service. If the calling party does not accept the service, the call is cancelled or processed normally. If the calling party accepts the service, for example, by entering an appropriate DTMF response, that information is conveyed (5) in a message from the originating switch 1406 to the SCP 1410. In response, the SCP initiates a GR 1129 message intended for the SN/IP 1410. The GR 1129 message may command the SN/IP 1410, for example, to play message 456 for subscriber 555-1234 and collect digits for routing. This GR 1129 message is routed (6) from the originating switch 1406 to the terminating switch 1408 for the SN/IP 1410. The GR 1129 message is decoded or decrypted to extract the command contained therein. In response, the SN/IP 1410 executes a plurality of instructions or an application, including associated data. The SN/IP 1410 plays (8) service logic which implements menu selections and associated telephone numbers.

The SN/IP 1410 formats a GR 1129 message including data about the digits entered by the calling party at the calling communications station 1402. This message is routed (8) to the SCP 1410 for processing. The SCP 1410 analyzes the collective digits and routes (9) the call based on the collected digits. The call is routing to a called communications station 1420 associated with the terminating directory number, 633-4545 in the example of FIG. 14, specified by the menu selection of the calling party.

In accordance with another embodiment, the SCP database 1412 may be accessed over the Internet 1422 or other network by the subscriber using a remote device 1424 such as a personal computer. In this manner, the subscriber profile or other call routing option information presented to calling parties may be stored or updated. This may be accomplished in accordance with any of the embodiments described herein.

From the foregoing, it can be seen that the present invention provides methods and apparatus for providing customized call routing based on providing the caller a menu of options. Provision is made for initiating or updating a subscriber profile by means of a variety of methods. The subscriber profile is used to format a menu of options which are provided to a calling party, either initially or detecting a no-answer condition at a called communication station. The calling party's menu response is detected and the call is routed according to this perceived response.

While particular embodiments of the present invention have been shown and described, modifications may be made. The operational blocks shown in the block diagrams of the drawing may be embodied as hardware components, software code operating in conjunction with hardware, or a combination of the two. Implementation of such functions in hardware, software or a combination thereof is well within the purview of those ordinarily skilled in the appropriate art. Further, such illustrated functionality may be combined with other operations by way of modification. Accordingly, it is therefore intended in the appended claims to cover such changes and modifications that follow in the true spirit and scope of the invention.

The invention claimed is:

1. A method for establishing call routing information from a subscriber to a call routing service in an Advanced Intelligent Network (AIN) telecommunications system, the call routing service permitting customized call routing based on providing call routing options to a caller the method comprising:

providing to the subscriber a World Wide Web display including data entry slots configured to receive one or more call termination options and corresponding telephone numbers;

receiving from the subscriber, at a web server arranged for data communication with the subscriber, a data transmission containing data defining a spoken name or place to be uttered by a subsequent caller for the subscriber, the spoken name or place being related to the one or more call termination options and the corresponding telephone numbers; and storing from the web server to at least one of a Service Control Point and a Service Node and an Intelligent Peripheral of the AIN telecommunication system the data for subsequent access and use during processing of a call from the caller to the subscriber by the AIN telecommunication system implementing the call routing service.

2. The method of claim 1 wherein receiving the data transmission comprises receiving one or more TCP/IP packets from the subscriber over the Internet.

3. The method of claim 1 wherein receiving the data transmission comprises receiving a subscription number associated with the subscriber.

4. The method of claim 1 wherein providing the World Wide Web display comprises:

providing one or more call destination option fields arranged to receive data defining the one or more call termination options; and providing one or more telephone number fields, each telephone number field corresponding to one or more call termination options.

5. The method of claim 1 further comprising formatting the data into a subscriber profile.

6. The method of claim 2 wherein receiving one or more TCP/IP packets from the subscriber comprises receiving in the one or more TCP/IP packets a subscription number or other identifying information for the subscriber and the selections of the subscriber.

7. The method of claim 4 wherein providing the World Wide Web display further comprises providing an alpha entry field which may be filled with data defining a location, an individual or other text message to be delivered to a caller calling the subscriber.

8. The method of claim 4 wherein providing one or more telephone number fields comprises providing a data entry field on the World Wide Web display configured to receive data defining a telephone number and wherein providing one or more call termination option fields comprises providing a data entry field on the World Wide Web display configured for actuation to associate a call termination option field with a telephone number field.

9. The method of claim 4 wherein receiving the data transmission comprises receiving data representative of telephone numbers entered in the one or more telephone number fields and call termination option information associated with the one or more telephone number fields.

10. The method of claim 5 further comprising:

providing information about the subscriber profile to a subscriber in response to a request from the subscriber for updating the information about the subscriber profile.

11. The method of claim 5 further comprising:

communicating the subscriber profile for storage at one of the Service Control Point and the Service Node and the Intelligent Peripheral.

* * * * *